United States Patent [19]
Morris et al.

[11] 3,719,320
[45] March 6, 1973

[54] MOTION REVERSING LEVER MECHANISM FOR A THERMOSTATIC CONTROL LEVER

[75] Inventors: Louis P. Morris, Garden Grove; Theodore J. Dykzeul, Rolling Hills, both of Calif.

[73] Assignee: Robertshaw Controls Company, Richmond, Va.

[22] Filed: Feb. 23, 1971

[21] Appl. No.: 118,013

[52] U.S. Cl. ................... 236/48, 74/110, 236/99, 251/75
[51] Int. Cl. ................................................. F16k 31/56
[58] Field of Search ............ 236/48, 102, 99; 251/75; 74/110

[56] References Cited

UNITED STATES PATENTS 1,492,762  5/1924  Straub ........................... 236/102
1,683,172  7/1928  Doen ............................ 236/48 R
1,845,027  2/1932  Lonergan ....................... 236/102

Primary Examiner—William E. Wayner
Attorney—Brenner, O'Brien & Guay

[57] ABSTRACT

A motion reversing lever mechanism disposed between a valve assembly and a thermally responsive element in a thermostatic control device and including an actuating lever fulcrumed at one end and engaging the valve assembly at an intermediate point, and an intermediately fulcrumed supplemental lever engaging the thermally responsive element at one end and the actuating lever at its other end such that movement of the thermally responsive element in one direction is transmitted by the levers to the valve assembly for moving the same in an opposite direction.

6 Claims, 2 Drawing Figures

PATENTED MAR 6 1973

3,719,320

INVENTORS
LOUIS P. MORRIS
THEODORE J. DYKZEUL

BY Brenner, O'Brien, Guay & Connors

ATTORNEYS

MOTION REVERSING LEVER MECHANISM FOR A THERMOSTATIC CONTROL LEVER

BACKGROUND OF THE INVENTION

1. Field of the Invention:

The present invention pertains to lever mechanisms and more particularly to a motion reversing lever mechanism for a thermally responsive element in a thermostatic control device.

2. Description of the Prior Art:

U.S. Pat. Nos. 2,880,936 and 3,159,346 are representative of prior art control devices used to control the flow of fuel to a burner for heating a water supply tank. In such devices, a snap acting fuel valve is controlled through a lever by a thermally responsive element adapted to extend into the tank with one end of the lever fulcrumed on a temperature setting shaft so as to provide an external adjustment for the device.

The thermally responsive element most often utilized in such devices is of the conventional rod and tube type in which the tube is made of a material having a high coefficient of thermal expansion and the rod is made of a material having a relatively low coefficient of thermal expansion. The rod is fixed to the outer end of the tube such that it follows longitudinal movement thereof produced by thermal expansion and contraction; in other words, the actuating end of the rod moves away from the control device casing upon being heated and moves toward the casing upon being cooled.

While the prior art control devices have proven to be satisfactory, they are generally designed for use with rod and tube elements and thus cannot readily be adapted for use with thermally responsive elements of the type in which a rod or button is moved opposite to a rod and tube element, i.e., toward the casing in response to heat and away from the casing upon being cooled. This has been found to be disadvantageous since the use of one type of thermal element may be preferred over another type in various installations.

SUMMARY OF THE INVENTION

It is therefore an object of the present invention to construct a motion reversing lever mechanism for a thermostatic control device.

The present invention is summarized in a thermostatic control device including a casing having inlet and outlet ports and a flow passage therebetween, a snap acting valve movable between open and closed positions in such passage for controlling flow therethrough, a thermally responsive element movable in response to sensed temperature variations, an actuating lever fulcrumed at a first end on the casing and operatively connected at an intermediate point with the snap acting valve for movement thereof, and a supplemental lever intermediately fulcrumed on the casing and operatively connected at a first end with the thermally responsive element for movement thereby, the supplemental lever being operatively connected at a second end with a second end of the actuating lever whereby movement of the thermally responsive element in one direction causes movement of the snap acting valve in an opposite direction.

Another object of the present invention is to reverse the movement of a thermally responsive element so that its effect on a valve assembly in a thermostatic control device is equivalent to the effect produced by use of a conventional rod and tube element.

This invention has a further object in that a pair of lever elements cooperate to reverse the movement of a thermal element in a thermostatic control device.

The present invention is advantageous in that it is simple, economical, and readily adaptable to existing thermostatic control devices for enabling the use of other than rod and tube type thermal elements.

Other objects and advantages of the present invention will become apparent from the following description of a preferred embodiment taken in conjunction with the accompanying drawing.

DESCRIPTION OF THE PREFERRED EMBODIMENT

Figure 1:
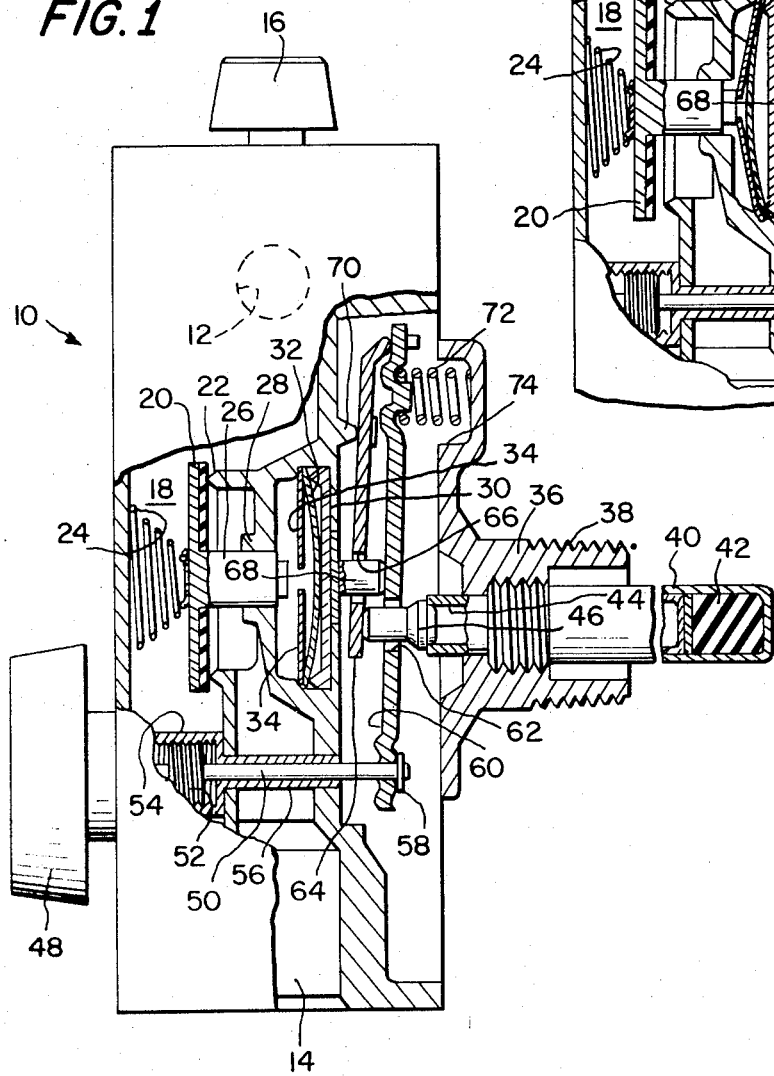
FIG. 1 is a side elevational view of a thermostatically controlled device embodying a motion reversing lever mechanism according to the present invention with parts broken away.

As illustrated in FIG. 1, the present invention is embodied in a thermostatic control device including a casing, indicated generally at 10, having an inlet port 12 for receiving fuel from a gas source (not shown) and an outlet port 14 for delivering fuel to burner apparatus (not shown). Such control devices conventionally include a second outlet port for delivering a small flow of fuel to a pilot burner from the main burner apparatus such that the pilot burner flame effects reignition to permit thermostatic cycling of the device; a manually resettable thermoelectric safety device is retained in a flow permitting position in response to the pilot burner flame and shuts off all fuel flow upon pilot flame outage. The above-described pilot flow control device may be of any suitable type and is not shown or described in detail for the sake of brevity.

The flow of fuel into the casing 10 is controlled by a manually operated on-off valve assembly 16 disposed adjacent the inlet port 12 as is well known in the art; the downstream side of the on-off valve 16 communicates with an inlet chamber 18, from which the fuel flow to the outlet 14 is thermostatically controlled. Disposed between inlet chamber 18 and outlet port 14 is a thermostatic valve assembly including a main valve disc 20 which is biased toward a valve seat 22 formed in the casing by a coil spring 24 mounted in compression between the valve disc 20 and the adjacent interior surface of the casing 10. A valve stem 26 centrally affixed to valve disc 20 protrudes axially through the valve seat 22 and slidably extends through a bored boss 28 in an internal wall of casing 10. The end of valve stem 26 protrudes into a counterbore in the wall of casing 10, which houses a snap acting mechanism including a generally flat fulcrum disc 30 having an annular knife edge or fulcrum formed on one surface thereof adjacent its periphery. A bowed clicker disc 32 is disposed for engagement by the peripheral fulcrum of disc 30 and has a central portion positioned adjacent the central portions of a pair of lever arms 34. For a more detailed description of the snap acting mechanism, reference is made to the above-mentioned U.S. Pat. No. 3,159,346.

The thermostat for actuating valve 20 through the above-described snap acting mechanism may be of any suitable type and typically includes a mounting shank 36 secured to the rear wall of casing 10 as by threaded cap screws (not shown) and having an externally threaded boss 38 for attaching the entire control device to a heating appliance such as the tank of a hot water heater. A tube 40 is sealed at an outer end and is threadedly attached to the mounting shank 36. Tube 40 contains a suitable thermally expansible element 42 which is adapted to move an operator member 44 in accordance with sensed temperature variations. Operator member 44 carries an actuating button 46 at its distal end with the action of the thermally responsive device being opposite that of a conventional rod and tube element; i.e., as the thermal element 42 is heated, it expands to move actuating button 46 toward the casing 10, and similarly as the element 42 is cooled, actuating button 46 is moved away from the casing.

A temperature selection dial 48 is mounted on the external end of an adjusting shaft 50 which is threaded at 52 for cooperation with an internally threaded bushing 54 of casing 10. Shaft 50 is axially movable in a sleeve 56 extending across the flow passage adjacent the outlet port 14 and sealed with the casing walls at both ends. A washer 58 is secured to the free end of shaft 50 for retaining the end of an actuating lever 60 which is freely disposed thereon.

Lever 60 defines an aperture 62 permitting actuating button 46 to freely move therethrough for engagement with the lower end of a supplemental lever 64. Lever 64 similarly defines an aperture 66 for freely accommodating a thrust button 68 centrally affixed to the outer surface of fulcrum disc 30 and engaging an intermediate point of actuating lever 60. Supplemental lever 64 is intermediately fulcrumed about an outwardly directed protrusion 70 formed on an interior casing wall. The upper end of supplemental lever 64 is bifurcated to engage a conforming tongue formed at the upper end of actuating lever 60. A biasing spring 72 is mounted in compression between the upper end of actuating lever 60 and a recess 74 defined by shank 36.

In the following description of a sequence of operation of the above thermostatically controlled device, it is assumed that manual on-off valve 16 is open permitting a pilot flow of fuel to a pilot burner for ignition of the main fuel flow during thermostatic cycling. At the same time, there is a main flow of fuel from the inlet port 12 through the on-off valve 16 to the inlet chamber 18 whereupon it is controlled by valve 20 according to the demand sensed by thermal element 42.

Initially, it will be assumed that the temperature setting control 48 has been moved to a selected temperature setting which defines the desired operating temperature of the medium sensed by the thermal element. The relative positions of the valve 20 and snap acting mechanism 30, 32 and 34 in FIG. 1 represent the condition existing when there is no demand for main burner operation. In this condition the temperature of the medium is above the preselected temperature setting of knob 48 with thermal element 42 in an expanded state such that operator member 44 is moved out of the tube 40 or to the left as viewed in FIG. 1. With thermal element 42 in its expanded condition, actuator button 46 moves the lower end of secondary lever 64 to the left so as to rotate the lever in a clockwise direction about fulcrum 70. Rotation of lever 64 causes rotation of actuating lever 60 in a clockwise direction about the point at its lower end defined by washer 58 acting as a fulcrum. With actuating lever 60 in its clockwise position, thrust button 68 of fulcrum disc 30 will assume the position illustrated in FIG. 1 thus enabling valve 20 to engage valve seat 22 under the force of spring 24. It is noted that the spring force exerted by clicker spring 32 through fulcrum disc 30 and thrust button 68 to the actuating lever 60 cooperates with the biasing force of spring 72 to maintain the lower end of the actuating lever 60 against retaining washer 58.

As the temperature of the medium decreases, thermal element 42 contracts so as to permit operator member 44 to withdraw into the tube 40 and with the actuator button 46 to move to the right as visualized in FIG. 1. As a result, supplemental lever 64 rotates counterclockwise about fulcrum 70 under the force of biasing spring 72. Rotation of supplemental lever 64 permits actuating lever 60 to similarly rotate in a counterclockwise direction about retaining washer 58. As the actuating lever 60 is rotated, thrust button 68 is moved to the left whereupon fulcrum disc 30 transmits such movement to clicker spring 32 causing it to snap overcenter. With spring 32 in such flexed position, valve stem 26 is moved to the left causing valve 20 to open (as shown in FIG. 2) and to establish a main flow of fuel to the burner apparatus (not shown) where it is ignited to satisfy the demand for heat.

It is noted that the point at which clicker spring 32 is snapped overcenter may be readily adjusted by moving shaft 50 to the left or to the right so as to vary the fulcrum position of actuating lever 60 as defined by washer 58.

Figure 2:
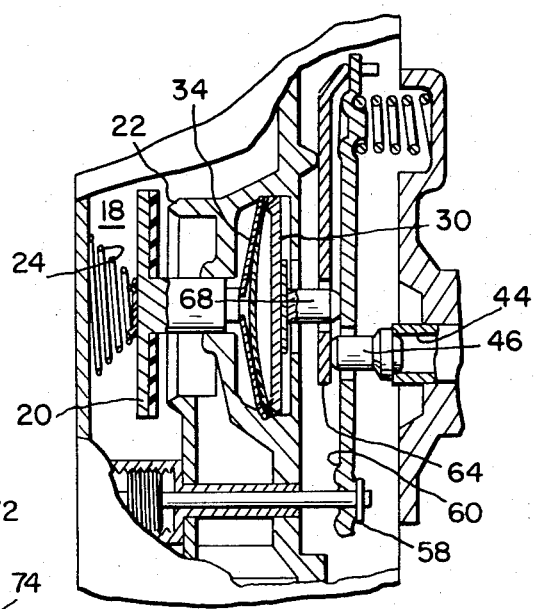
FIG. 2 is an enlarged sectional view of a detail of the motion reversing lever mechanism of FIG. 1 in another controlling position.

Thus, as the temperature of the medium increases, the thermal element 42 expands and causes button 46 to move to the left in FIG. 2. This in turn causes lever 64 to rotate clockwise about fulcrum 70, causing actuating lever 60 also to rotate clockwise about the end of temperature setting shaft 50 acting as its fulcrum. This causes the compression of spring 72 such that the force acting on thrust button 68 is relieved to allow the button to move to the right causing clicker spring 32 to snap overcenter whereupon valve 20 is moved with a snap action from its opened position illustrated in FIG. 2 to its closed position illustrated in FIG. 1.

As the temperature of the medium decreases, thermal element 42 contracts such that button 46 moves to the right. As a result, both levers rotate counterclockwise about their respective fulcrums to move thrust button 68 to the left to force the snap acting spring 32 overcenter for opening the valve 20 as shown in FIG. 2.

Thus, the present invention resides in a simple and economical mechanism for reversing the movement of a thermal element used to control a valve assembly. The above motion reversing lever arrangement has the particular advantage in that existing control devices may be readily adapted for use with thermally responsive elements operating opposite to conventional elements of the rod and tube type.

Inasmuch as the present invention is subject to many variations, modifications and changes in detail, it is intended that all matter contained in the foregoing description or shown in the accompanying drawing shall be interpreted as illustrative and not in a limiting sense.

What is claimed is:

1. In a thermostatic control device, the combination comprising casing means having inlet and outlet port means and a flow passage therebetween;

valve means in said flow passage for controlling flow therethrough;

said valve means including a fixed valve seat and a valve element movable in a valve opening direction away from said seat and in a valve closing direction toward said seat;

a snap acting mechanism causing said valve element to move with snap action;

thermally responsive means operative in response to temperature variations of a medium being temperature controlled;

temperature setting means operatively carried by said casing means for establishing a predetermined set temperature for such medium;

actuating lever means including a first end portion fulcrumed on said temperature setting means, an intermediate portion, a second end portion, and biasing means acting on said second end portion whereby said intermediate portion is biased into engagement with said snap acting mechanism;

said thermally responsive means including a housing fixed to said casing means and adapted to be disposed in the medium, a thermal element in said housing adapted to expand and contract in accordance with respective increases and decreases of temperature in the medium, and an actuator button movably carried by said housing for movement in a first direction in response to temperature decreases contracting said thermal element and in a second direction in response to temperature increases expanding said thermal element; and supplemental lever means fulcrumed intermediate its ends on said casing means with one end being engaged with the second end portion of said actuating lever means for unitary movement therewith and with its other end being in engagement with said actuator button for unitary movement therewith;

said supplemental lever means causing said actuating lever means to effect movement of said valve element in valve opening and valve closing directions in response to movements of said actuator button in its first and second directions, respectively, with the valve opening direction being opposite to the first direction of said actuator button when said thermal element contracts and the valve closing direction being opposite to the second direction of said actuator button when said thermal element expands.

2. The invention as recited in claim 1 wherein said valve element and said snap acting mechanism are operatively disposed along a first longitudinal axis and wherein said thermally responsive means are operatively disposed along a second longitudinal axis in spaced parallel relation to said first longitudinal axis.

3. The invention as recited in claim 2 wherein said actuating lever means and said supplemental lever means are disposed alongside each other in substantially parallel planes which are generally perpendicular to planes defined by said first and second longitudinal axes.

4. The invention as recited in claim 3 wherein said actuating lever means has an aperture therethrough and wherein said actuator button extends through said aperture.

5. The invention as recited in claim 4 wherein said supplemental lever means has an opening therethrough and wherein said snap acting mechanism includes a thrust button extending through said opening to engage the intermediate portion of said actuating lever means.

6. The invention as recited in claim 5 wherein said biasing means includes a coil spring mounted in compression between the second end portion of said actuating lever means and an adjacent wall portion of said casing means.

* * * * *